US 11,458,711 B2

United States Patent
Ogata et al.

(10) Patent No.: US 11,458,711 B2
(45) Date of Patent: Oct. 4, 2022

(54) FABRIC HAVING MULTILAYER STRUCTURE AND METHOD FOR PRODUCING SAME, AND FIBER PRODUCT

(71) Applicant: TEIJIN FRONTIER CO., LTD., Osaka (JP)

(72) Inventors: Nobuaki Ogata, Osaka (JP); Sonomi Shibata, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 148 days.

(21) Appl. No.: 16/757,608

(22) PCT Filed: Oct. 23, 2018

(86) PCT No.: PCT/JP2018/039354
§ 371 (c)(1),
(2) Date: Apr. 20, 2020

(87) PCT Pub. No.: WO2019/102770
PCT Pub. Date: May 31, 2019

(65) Prior Publication Data
US 2020/0324531 A1 Oct. 15, 2020

(30) Foreign Application Priority Data
Nov. 22, 2017 (JP) .............................. JP2017-224727

(51) Int. Cl.
| | |
|---|---|
| B32B 27/12 | (2006.01) |
| A41D 31/02 | (2019.01) |
| B32B 5/02 | (2006.01) |
| D04B 1/16 | (2006.01) |
| D04B 1/24 | (2006.01) |
| B32B 27/36 | (2006.01) |
| B32B 27/40 | (2006.01) |

(52) U.S. Cl.
CPC .............. *B32B 27/12* (2013.01); *A41D 31/02* (2013.01); *B32B 5/026* (2013.01); *B32B 27/36* (2013.01); *B32B 27/365* (2013.01); *B32B 27/40* (2013.01); *D04B 1/16* (2013.01); *D04B 1/24* (2013.01); *B32B 2250/02* (2013.01); *B32B 2262/0261* (2013.01); *B32B 2262/0284* (2013.01); *B32B 2307/724* (2013.01); *B32B 2307/728* (2013.01); *B32B 2437/00* (2013.01); *D10B 2331/02* (2013.01); *D10B 2331/04* (2013.01); *D10B 2501/04* (2013.01)

(58) Field of Classification Search
CPC .... D04B 1/16; D04B 1/24; A43B 1/04; A43B 23/0235; A43B 1/00; A41D 31/02; A41D 31/102; A41D 31/00
See application file for complete search history.

(56) References Cited

U.S. PATENT DOCUMENTS

| | | | | |
|---|---|---|---|---|
| 2002/0124366 | A1* | 9/2002 | Hirsch | D04H 1/4274 28/103 |
| 2010/0287680 | A1* | 11/2010 | Johnson | B32B 5/08 156/60 |

FOREIGN PATENT DOCUMENTS

| | | | | |
|---|---|---|---|---|
| EP | 1260355 A1 | 11/2002 | | |
| JP | 01-111074 A | 4/1989 | | |
| JP | 5-338069 A | 12/1993 | | |
| JP | 2000256948 A | * | 9/2000 | |
| JP | 2010-201811 A | 9/2010 | | |
| JP | 2012-135968 A | 7/2012 | | |
| JP | 2012135968 A | * | 7/2012 | ............. B32B 5/026 |
| JP | 2012-153986 A | 8/2012 | | |
| JP | 2012-161924 A | 8/2012 | | |
| JP | 2013-116625 A | 6/2013 | | |
| JP | 2013119689 A | * | 6/2013 | |
| WO | 2012/090685 A1 | 7/2012 | | |
| WO | 2017/104338 A1 | 6/2017 | | |
| WO | 2019/230482 A1 | 12/2019 | | |

OTHER PUBLICATIONS

International Preliminary Report on Patentability dated May 26, 2020 with translation of Written Opinion of the International Searching Authority, issued by the International Bureau in International Application No. PCT/JP2018/039354.
Extended European Search Report dated Jul. 2, 2021 in Application No. 18882148.2.
International Search Report for PCT/JP2018/039354 dated Dec. 11, 2018 [PCT/ISA/210].

* cited by examiner

*Primary Examiner* — Alicia J Sawdon
(74) *Attorney, Agent, or Firm* — Sughrue Mion, PLLC

(57) ABSTRACT

A task is to provide a multilayer-structure cloth having excellent water vapor permeability, lightweight properties, stretchability, and thinness, and a method for producing the same and a fiber product. The task is attained by laminating a resin film on single circular knitted fabric which comprises a non-crimped synthetic fiber multifilament having a total fineness of 44 dtex or less, and which has a knitting density that is 45 to 130 course/2.54 cm and 55 to 120 wales/2.54 cm to obtain a multilayer-structure cloth.

6 Claims, No Drawings

FABRIC HAVING MULTILAYER STRUCTURE AND METHOD FOR PRODUCING SAME, AND FIBER PRODUCT

CROSS REFERENCE TO RELATED APPLICATIONS

This application is a National Stage of International Application No. PCT/JP2018/039354 filed Oct. 23, 2018, claiming priority based on Japanese Patent Application No. 2017-224727 filed Nov. 22, 2017.

TECHNICAL FIELD

The present invention relates to a multilayer-structure cloth having excellent water vapor permeability, lightweight properties, stretchability, and thinness, and a method for producing the same and a fiber product.

BACKGROUND ART

Conventionally, a water vapor permeable, waterproof cloth having windbreak performance has been proposed in the use as clothing, wherein the cloth is obtained by laminating a resin film on one surface of fabric, such as woven fabric or knitted fabric, by a method of coating or lamination (for example, PTL 1).

On the other hand, with respect to the water vapor permeable, waterproof cloth, there is required a cloth having such excellent comfortability when being worn that the cloth is excellent not only in water vapor permeability but also in lightweight properties, stretchability, and thinness.

However, a cloth having excellent water vapor permeability, lightweight properties, stretchability, and thinness has not yet been proposed.

CITATION LIST

Patent Literature

PTL 1: JP-A-2010-201811

SUMMARY OF INVENTION

Technical Problem

The present invention has been made in view of the above background, and an object of the invention is to provide a multilayer-structure cloth having excellent water vapor permeability, lightweight properties, stretchability, and thinness, and a method for producing the same and a fiber product.

Solution to Problem

The present inventor has conducted extensive and intensive studies with a view toward achieving the above-mentioned object. As a result, it has been found that, by improving the fineness and form of the fiber used in a cloth, the structure of a cloth, and the like, a multilayer-structure cloth having excellent water vapor permeability, lightweight properties, stretchability, and thinness can be obtained, and further extensive and intensive studies have been made, and thus the present invention has been completed.

In an aspect of the invention, there is provided "a multi-layer-structure cloth comprising a cloth and a resin film, wherein the cloth is single circular knitted fabric which comprises a non-crimped synthetic fiber multifilament having a total fineness of 44 dtex or less, and which has a knitting density that is 45 to 130 course/2.54 cm and 55 to 120 wales/2.54 cm".

In the multilayer-structure cloth of the invention, it is preferred that the non-crimped synthetic fiber multifilament is formed from a polyester fiber or a polyamide fiber. It is preferred that the non-crimped synthetic fiber multifilament has a tensile strength of 4.0 cN/dtex or more. It is preferred that the non-crimped synthetic fiber multifilament is a recycled yarn. It is preferred that the single circular knitted fabric has a sheeting structure. It is preferred that the resin film is an urethane film, a polyester film, a polycarbonate film, or a fluorine film. It is preferred that the resin film has a thickness of 15 μm or less.

It is preferred that the multilayer-structure cloth of the invention has a weight per unit of 79 $g/m^7$ or less. It is preferred that the multilayer-structure cloth has a thickness of 0.3 mm or less. It is preferred that the multi layer-structure cloth has a water vapor permeability of 20,000 $g/m^2 \cdot 24$ h or more.

In another aspect of the invention, there is provided a method for producing the above-mentioned multilayer-structure cloth, wherein the method comprises obtaining single circular knitted fabric using a 46-gauge or more single circular knitting machine, and then laminating a resin film on the single circular knitted fabric.

In still another aspect of the invention, there is provided a fiber product which is obtained using the above-mentioned multilayer-structure cloth, and which is any one fiber product selected from the group consisting of sportswear, outdoor wear, a raincoat, men's clothes, women's clothes, work clothing, protective clothing, an artificial leather, footwear, a bag, a curtain, a tent, a sleeping bag, a waterproof sheet, an umbrella, and a car seat. In the fiber product of the invention, it is preferred that the fiber product has a weight of 150 g/one piece or less.

Advantageous Effects of Invention

By the present invention, there can be obtained a multi layer-structure cloth having excellent water vapor permeability, lightweight properties, stretchability, and thinness, and a method for producing the same and a fiber product.

DESCRIPTION OF EMBODIMENTS

Hereinbelow, an embodiment of the present invention will be described in detail. The multilayer-structure cloth of the invention comprises a cloth formed from single circular knitted fabric which comprises a non-crimped synthetic fiber multifilament having a total fineness of 44 dtex or less, and which has a knitting density that is 45 to 130 course/2.54 cm and 55 to 120 wales/2.54 cm, and a resin film laminated on the cloth.

The resin film nay be laminated on either both surfaces or one surface of the cloth. Preferred is the latter (i.e., the multilayer-structure cloth which has a two-layer structure).

With respect to the non-crimped synthetic fiber multifilament, when the total fineness is larger than 44 dtex, the lightweight properties and water vapor permeability disadvantageously become poor. The total fineness of the non-crimped synthetic fiber multifilament is preferably 8 to 40 dtex (more preferably 8 to 25 dtex, further preferably 8 to 19 dtex). In the non-crimped synthetic fiber multifilament, with respect to the single fiber fineness, there is no particular limitation, but the single fiber fineness is preferably 0.9 to 2.8 dtex. The number of filaments is preferably 15 to 300.

The non-crimped synthetic fiber multi filament may be an air textured yarn or a side-by-side type conjugate fiber, but it is important that the synthetic fiber multifilament is non-crimped. When the synthetic fiber multifilament is a crimped yarn, such as a false twisted crimped textured yarn, the resultant cloth disadvantageously has an increased thickness. It is preferred that the non-crimped synthetic fiber multifilament is a continuous fiber.

Further, with respect to the non-crimped synthetic fiber multifilament, when the tensile strength is 4.0 cN/dtex or more (more preferably 4.2 cN/dtex or more, more preferably 4.5 cN/dtex or more, further preferably 5.5 to 10.0 cN/dtex), the resultant multilayer-structure cloth advantageously has an improved tear strength. For obtaining a polyethylene terephthalate fiber having a tensile strength of 4.0 cN/dtex or more, for example, the fiber can be produced by the method described in JP-A-2013-119689 or JP-A-2010-168675. Specifically, the fiber is produced by a method in which polyethylene terephthalate having an intrinsic viscosity of 0.7 to 1.5 is melted at 290 to 310° C., and the melted polymer is discharged through a spinning nozzle having a discharge pore having a circular cross-section and cooled using cooling air, and then a lubricant is applied to the resultant yarn using an oiling nozzle, and the yarn is stretched and then wound (or the yarn before being stretched is wound, and then stretched).

Further, in the non-crimped synthetic fiber multifilament, with respect to the single fiber cross-sectional form, there is no particular limitation, and the fiber may have a known cross-sectional form, such as a circle, a triangle, a flattened form, or a hollow form.

With respect to the type of the polymer used for forming the non-crimped synthetic fiber multifilament, there is no particular limitation, and a polyester, a polyamide, or the like is preferred. A polyester or polyamide obtained by material recycle or chemical recycle, or the like is also preferred. Further, the polymer may be, as described in JP-A-2004-270097 and JP-A-2004-211268, a polyester obtained using a catalyst containing a specific phosphorus compound and titanium compound. If necessary, the polymer may contain one member or two or more members of a micropore forming agent, a cationically dyeable agent, a color protection agent, a heat stabilizer, a fluorescent brightener, a matting agent, a colorant, a moisture absorbing agent, and inorganic particles in such an amount that the effects aimed at by the invention are not sacrificed.

The single circular knitted fabric may contain a fiber other than the non-crimped synthetic fiber multifilament, but it is most preferred that the single circular knitted fabric is formed from only the non-crimped synthetic fiber multifilament.

It is important that the single circular knitted fabric has a knitting density that is 45 to 130 course/2.54 cm and 55 to 120 wales/2.54 cm. When the knitting density is larger than the above-mentioned range, the resultant cloth is likely to have an increased thickness. Conversely, when the knitting density is smaller than the above-mentioned range, the resultant cloth is likely to be poor in tear strength and the like.

Further, in view of the lightweight properties, the single circular knitted fabric preferably has a weight per unit of 50 g/m$^2$ or less (more preferably 20 to 41 g/m$^2$). When the weight per unit of the single circular knitted fabric is larger than 50 g/m$^2$, the lightweight properties are likely to become poor.

In the single circular knitted fabric, the structure of the circular knitted fabric is a weft-knitted structure, such as plain (sheeting), moss stitch, or 1×1 sheeting, and there is no particular limitation, but, taking into consideration the weight per unit, thickness, snagging resistance, cost, and the like, a sheeting structure is preferred.

In the method for producing the single circular knitted fabric, it is preferred that knitting is conducted using the above-mentioned non-crimped synthetic fiber multifilament, and using a 46-gauge or more (preferably 46- to 80-gauge) single circular knitting machine.

The single circular knitted fabric may be appropriately subjected to post-processing, such as general dyeing processing, weight-reduction processing, raising processing, water-repellent processing, thermal storage processing, or sweat absorbent processing. In such a case, the dye used in dyeing is a disperse dye, a cationic dye, an acid dye, or the like, and is not particularly limited. However, when using a cationic dye, it is necessary to select a fiber dyeable with the cationic dye, and therefore a disperse dye having higher general-purpose properties is more preferably used. As a water repellent used in the water-repellent processing, a known water repellent, such as a paraffin water repellent, a polysiloxane water repellent, a fluorine water repellent, or a non-fluorine water repellent, can be used. The water-repellent processing can be performed by a known method, such as a padding method or a spraying method, which is generally conducted.

The multilayer-structure cloth of the invention is obtained by laminating a resin film on the above-mentioned single circular knitted fabric. In the multilayer-structure cloth, it is preferred that the resin film is an urethane film, a polyester film, a polycarbonate film, or a fluorine film. In view of the lightweight properties and water vapor permeability, the thickness of the resin film is preferably 15 µm or less (more preferably 5 to 15 µm). For reducing friction caused when wearing the cloth, the film surface of the two-layer structure of the cloth may be partially printed with a resin.

As examples of urethane resin films, there can be mentioned a film formed from an urethane resin having water vapor permeability and an urethane resin coating, and there is no particular limitation. As examples of fluorine films, there can be mentioned a polytetrafluoroethylene resin film (for example, manufactured by W. L. Gore & Associates, Inc.), and there is no particular limitation. Further, an acrylic resin coating can be used.

With respect to the polyester film, a polyester film formed from a polyether-ester elastomer or PBT (polybutylene terephthalate) is preferably used.

The above-mentioned film may be either a porous film or a non-porous film having water vapor permeability and being mainly made of a polyester. With respect to the method for imparting water vapor permeability to a polyester, there is no particular limitation, but a method is preferably used in which a moisture absorbing material, such as polyethylene glycol, is copolymerized with a polyester. If necessary, inorganic particles, such as silicon oxide, titanium oxide, titanium nitride, boron nitride, boron carbide, silicon carbide, silicon nitride, potassium titanate, zinc oxide, alumina, or aluminum borate, or organic particles, such as acrylic, urethane, polyester, or polyamide particles, can be added to the film. Further, for coloring the film, a coloring pigment can be added, or, for improving the film strength, a crosslinking agent, an antioxidant, a thickener, or the like can be added to the film. The film can be laminated on a base cloth by lamination. It is preferred that an adhesive is used.

The thus obtained multilayer-structure cloth has excellent water vapor permeability, lightweight properties, stretchability, and thinness. The multilayer-structure cloth preferably has a weight per unit of 79 g/m² or less (more preferably 20 to 79 g/m², especially preferably 30 to 68 g/m²).

Further, the multilayer-structure cloth preferably has a thickness of 0.3 mm or less (more preferably 0.1 to 0.3 mm, especially preferably 0.11 to 0.21 mm). The multilayer-structure cloth preferably has a water vapor permeability of 20,000 g/m²·24 h or more (more preferably 20,000 to 150,000 g/m²·24 h, especially preferably 30,000 to 100,000 g/m²·24 h).

Next, in the invention, there can be obtained a fiber product which is obtained using the above-mentioned multilayer-structure cloth, and which is any one fiber product selected from the group consisting of sportswear, outdoor wear, a raincoat, men's clothes, women's clothes, work clothing, protective clothing, an artificial leather, footwear, a bag, a curtain, a tent, a sleeping bag, a waterproof sheet, an umbrella, and a car seat.

The fiber product uses the above-mentioned multilayer-structure cloth, and therefore has excellent water vapor permeability, lightweight properties, stretchability, and thinness. It is preferred that the fiber product has a weight of 150 g/one piece or less (more preferably 10 to 150 g/one piece).

EXAMPLES

Hereinbelow, the present invention will be described in detail with reference to the following Examples, which should not be construed as limiting the scope of the invention. In the following Examples, the physical properties were measured in accordance with the methods described below.

Total Fineness>

A total fineness was determined by making a calculation in accordance with JIS L1013 (2010) 8.3.1 A method.

<Weight Per Unit>

A weight per unit was measured in accordance with JIS L1096 (1990) 6.4.

<Thickness>

A thickness was measured in accordance with JIS L1096 (1990) 6.5.

<Water Vapor Permeability>

A water vapor permeability was measured in accordance with JIS L1099 (1993) B-1.

<Yarn Strength (Tensile Strength)>

A yarn strength was measured using a tensile tester at room temperature under conditions such that the yarn length was 25 cm and the pulling rate was 200 cm/min.

Example 1

Using a polyethylene terephthalate multifilament non-crimped yarn 11 dtex/10 fil, and using a 60-gauge knitting machine, knitting of single circular knitted fabric having a sheeting structure was conducted, and then the circular knitted fabric was dyed blue using a disperse dye in a general dyeing step including water-repellent processing. Then, a hydrophilic non-porous urethane film (thickness: 14 μm) made of a polyurethane resin was laminated on the sinker loop side of the circular knitted fabric using an urethane adhesive to obtain a multilayer-structure cloth (weight per unit: 35.8 g/m²). The results of the evaluation are shown in Table 1.

Then, using the multilayer-structure cloth, clothing (sportswear; weight: 150 g/one piece or less) was obtained and worn. As a result, it was found that the clothing had excellent water vapor permeability, lightweight properties, stretchability, and thinness.

Example 2

Using a polyethylene terephthalate multifilament non-crimped yarn 11 dtex/10 fil, and using a 60-gauge knitting machine, knitting of single circular knitted fabric having a sheeting structure was conducted, and then the circular knitted fabric was dyed blue using a disperse dye in a general dyeing step including water-repellent processing. Then, a hydrophilic non-porous urethane film (thickness: 14 μm) made of a polyurethane resin was laminated on the sinker loop side of the circular knitted fabric using an urethane adhesive to obtain a two-layer cloth. 7 dtex/1 fil tricot knitted fabric was laminated as a back layer on the film side of the two-layer laminated cloth using a polyurethane adhesive to obtain a three-layer laminated cloth (weight per unit: 49.5 q/m²). The results of the evaluation are shown in Table 1.

Then, using the multi layer-structure cloth, clothing (sportswear; weight: 150 g/one piece or less) was obtained and worn. As a result, it was found that the clothing had excellent water vapor permeability, lightweight properties, stretchability, and thinness.

Example 3

Using a nylon non-crimped yarn 11 dtex/10 fil, and using a 60-gauge knitting machine, knitting of single circular knitted fabric having a sheeting structure was conducted, and then the circular knitted fabric was dyed blue using an acid dye in a general dyeing step including water-repellent processing. Then, a hydrophilic non-porous urethane film (thickness: 14 μm) made of a polyurethane resin was laminated on the sinker loop side of the circular knitted fabric using an urethane adhesive to obtain a multilayer-structure cloth (weight per unit: 40.3 g/m²). The results of the evaluation are shown in Table 1.

Then, using the multilayer-structure cloth, clothing (sportswear; weight: 150 g/one piece or less) was obtained and worn. As a result, it was found that the clothing had excellent water vapor permeability, lightweight properties, stretchability, and thinness.

Example 4

Using a polyethylene terephthalate multifilament non-crimped yarn 17 dtex/18 fil, and using a 60-gauge knitting machine, knitting of single circular knitted fabric having a sheeting structure was conducted, and then the circular knitted fabric was dyed blue using a disperse dye in a general dyeing step including water-repellent processing. Then, a hydrophilic non-porous polyester film (thickness: 12 μm) made of a polyester resin was laminated on the sinker loop side of the circular knitted fabric using an urethane adhesive to obtain a multilayer-structure cloth (weight per unit: 40.4 g/m²). The results of the evaluation are shown in Table 1.

Then, using the multilayer-structure cloth, clothing (sportswear; weight: 150 g/one piece or less) was obtained and worn. As a result, it was found that the clothing had excellent water vapor permeability, lightweight properties, stretchability, and thinness.

Example 5

Using a polyethylene terephthalate multifilament non-crimped yarn 33 dtex/36 fil, and using a 46-gauge knitting machine, knitting of single circular knitted fabric having a sheeting structure was conducted, and then the circular knitted fabric was dyed blue using a disperse dye in a general dyeing step including water-repellent processing. Then, a hydrophilic non-porous urethane film (thickness: 14 urn) made of a polyurethane resin was laminated on the sinker loop side of the circular knitted fabric using an urethane adhesive to obtain a multilayer-structure cloth (weight per unit: 65.2 g/m$^2$). The results of the evaluation are shown in Table 1.

Comparative Example 2

Using a polyethylene terephthalate multifilament non-crimped yarn 22 dtex/24 fil, and using a 40-gauge knitting machine, knitting of double circular knitted fabric having an interlock structure was conducted, and then the circular knitted fabric was dyed dark blue using a disperse dye m a general dyeing step including water-repellent processing. Then, a hydrophilic non-porous urethane film made of a polyurethane resin was laminated on one surface of the circular knitted fabric using an urethane adhesive to obtain a two-layer cloth. 22 dtex/24 ft 1 circular knitted fabric was laminated as a back layer on the film side of the two-layer laminated cloth using a polyurethane adhesive to obtain a three-layer laminated cloth (weight per unit: 120.0 g/m$^2$). The results of the evaluation are shown in Table 1.

TABLE 1

| | Surface fabric | | | | Back fabric | | Surface fabric density (Course/ 2.54 cm)/ (Wales/ 2.54 cm) | Weight per unit of laminated cloth (g/m$^2$) | Thickness (mm) | Water vapor Permeability (g/m$^2$ · 24 h) |
|---|---|---|---|---|---|---|---|---|---|---|
| | Base yarn | Yarn strength of base yarn (cN/dtex) | Structure | Intermediate layer Film type | Base yarn | Structure | | | | |
| Exp. 1 | Polyester non-crimped yarn 11 dtex × 10 fil | 5.6 | Sheeting | Non-porous urethane film | — | — | 100/100 | 35.8 | 0.11 | 98,900 |
| Exp. 2 | Polyester non-crimped yarn 11 dtex × 10 fil | 5.6 | Sheeting | Non-porous urethane film | Nylon non-crimped yarn 7 dtex × 5 fil | Tricot half | 100/98 | 49.5 | 0.2 | 58,500 |
| Exp. 3 | Nylon non-crimped yarn 11 T 6 fil | 6.3 | Sheeting | Non-porous urethane film | — | — | 110/107 | 40.3 | 0.13 | 97,300 |
| Exp. 4 | Polyester non-crimped yarn 17 dtex × 18 fil | 4.5 | Sheeting | Non-porous polyester film | — | — | 72/102 | 40.4 | 0.13 | 55,100 |
| Exp. 5 | Polyester non-crimped yarn 33 dtex × 36 fil | 5.5 | Sheeting | Non-porous urethane film | — | — | 55/65 | 65.2 | 0.16 | 77,500 |
| Comp. Exp. 1 | Polyester false twisted textured yarn 22 dtex × 24 fil | 4.3 | Interlock | Non-porous urethane film | — | — | 62/72 | 80 | 0.36 | 30,000 |
| Comp. Exp. 2 | Polyester false twisted textured yarn 22 dtex × 24 fil | 4.3 | Interlock | Non-porous urethane film | Polyester non-crimped yarn 20 dtex × 24 fil | Sheeting | 62/72 | 120 | 0.39 | 15,000 |

Then, using the multilayer-structure cloth, clothing (sportswear; weight: 150 g/one piece or less) was obtained and worn. As a result, it was found that the clothing had excellent water vapor permeability, lightweight properties, stretchability, and thinness.

Comparative Example 1

Using a polyethylene terephthalate multifilament non-crimped yarn 22 dtex/24 fil, and using a 40-gauge knitting machine, knitting of double circular knitted fabric having an interlock structure was conducted, and then the circular knitted fabric was dyed dark blue using a disperse dye in a general dyeing step including water-repellent processing. Then, a hydrophilic non-porous urethane film made of a polyurethane resin was laminated on one surface of the circular knitted fabric using an urethane adhesive to obtain a multilayer-structure cloth (weight per unit: 80.0 g/m$^2$). The results of the evaluation are shown in Table 1.

INDUSTRIAL APPLICABILITY

In the present invention, there are provided a multilayer-structure cloth having excellent water vapor permeability, lightweight properties, stretchability, and thinness, and a method for producing the same and a fiber product, and the invention is of extremely great industrial significance.

The invention claimed is:

1. A multilayer-structure cloth comprising a cloth and a resin film,
    wherein the cloth is single circular knitted fabric which comprises a non-crimped synthetic fiber multifilament having a total fineness of 8 to 19 dtex, and which has a knitting density that is 100 to 130 course/2.54 cm and 55 to 120 wales/2.54 cm,
    wherein the non-crimped synthetic fiber multifilament is formed from a polyester fiber,
    and the non-crimped synthetic fiber multifilament has a tensile strength of 4.0 cN/dtex or more,
    and the single circular knitted fabric has a sheeting structure, and the resin film is an urethane film, a polyester film, a polycarbonate film, or a fluorine film, and the resin film has a thickness of 15 μm or less, and the multilayer-structure cloth has a weight per unit of 30 to 68 g/m$^2$, and the multilayer-structure cloth has a thickness of 0.3 mm or less.

2. The multilayer-structure cloth according to claim 1, wherein the non-crimped synthetic fiber multifilament is a recycled yarn.

3. The multilayer-structure cloth according to claim 1, which has a water vapor permeability of 20,000 g/m$^2$·24 h or more.

4. A method for producing the multilayer-structure cloth according to claim 1, comprising obtaining single circular knitted fabric using a 46-gauge or more single circular knitting machine, and then laminating a resin film on the single circular knitted fabric.

5. A fiber product which is obtained using the multilayer-structure cloth according to claim 1, and which is any one fiber product selected from the group consisting of sportswear, outdoor wear, a raincoat, men's clothes, women's clothes, work clothing, protective clothing, an artificial leather, footwear, a bag, a curtain, a tent, a sleeping bag, a waterproof sheet, an umbrella, and a car seat.

6. The fiber product according to claim 5, which has a weight of 150 g/one piece or less.

\* \* \* \* \*